United States Patent
Maeda et al.

Patent Number: 6,115,557
Date of Patent: Sep. 5, 2000

[54] ELECTRONIC CAMERA WITH LIGHT TRANSMISSIBLE RESIN BODY

[75] Inventors: Yutaka Maeda; Takayuki Hayashida; Yoshihiro Ishikawa, all of Asaka; Keizou Uchioke, Tokyo, all of Japan

[73] Assignee: Fuji Photo Film Co., Ltd., Minami-Ashigara, Japan

[21] Appl. No.: 09/120,140

[22] Filed: Jul. 22, 1998

[30] Foreign Application Priority Data

Jul. 22, 1997 [JP] Japan ..................................... 9-196048
Jul. 22, 1997 [JP] Japan ..................................... 9-196049

[51] Int. Cl.[7] .................................................. G03B 17/18
[52] U.S. Cl. ......................... 396/287; 396/535; 358/909.1
[58] Field of Search ............................... 396/6, 279, 281, 396/287–292, 429, 535, 539, 541; 358/909.1

[56] References Cited

U.S. PATENT DOCUMENTS

| | | | |
|---|---|---|---|
| 4,029,992 | 6/1977 | Engelstatter | 315/156 |
| 5,164,761 | 11/1992 | Isono et al. | 396/279 |
| 5,282,040 | 1/1994 | Sapir | 396/429 X |
| 5,432,578 | 7/1995 | Suzuki | 396/281 |
| 5,561,458 | 10/1996 | Cronin et al. | 396/429 X |
| 5,784,652 | 7/1998 | Schroder et al. | 396/6 |

FOREIGN PATENT DOCUMENTS 5-45708  2/1993  Japan.

*Primary Examiner*—Howard B. Blankenship

[57] ABSTRACT

A front chassis and a rear chassis of an electronic camera are made of light transmissible resin. The electronic camera has a plurality of light-shielding elements to prevent unnecessary light (external ambient light and internally emitted light, for example) from entering optical systems such as taking lenses and light guides which guide light to an electronic flash control sensor. Further, the shielding elements prevent unnecessary light from entering photoelectric converters such as imaging devices and electronic flash control sensors. These light shielding elements enables the interior components of the camera to be visible therethrough, while ensuring that operational functions of the electronic camera are not adversely affected by entering unnecessary light.

41 Claims, 15 Drawing Sheets

F I G. 4
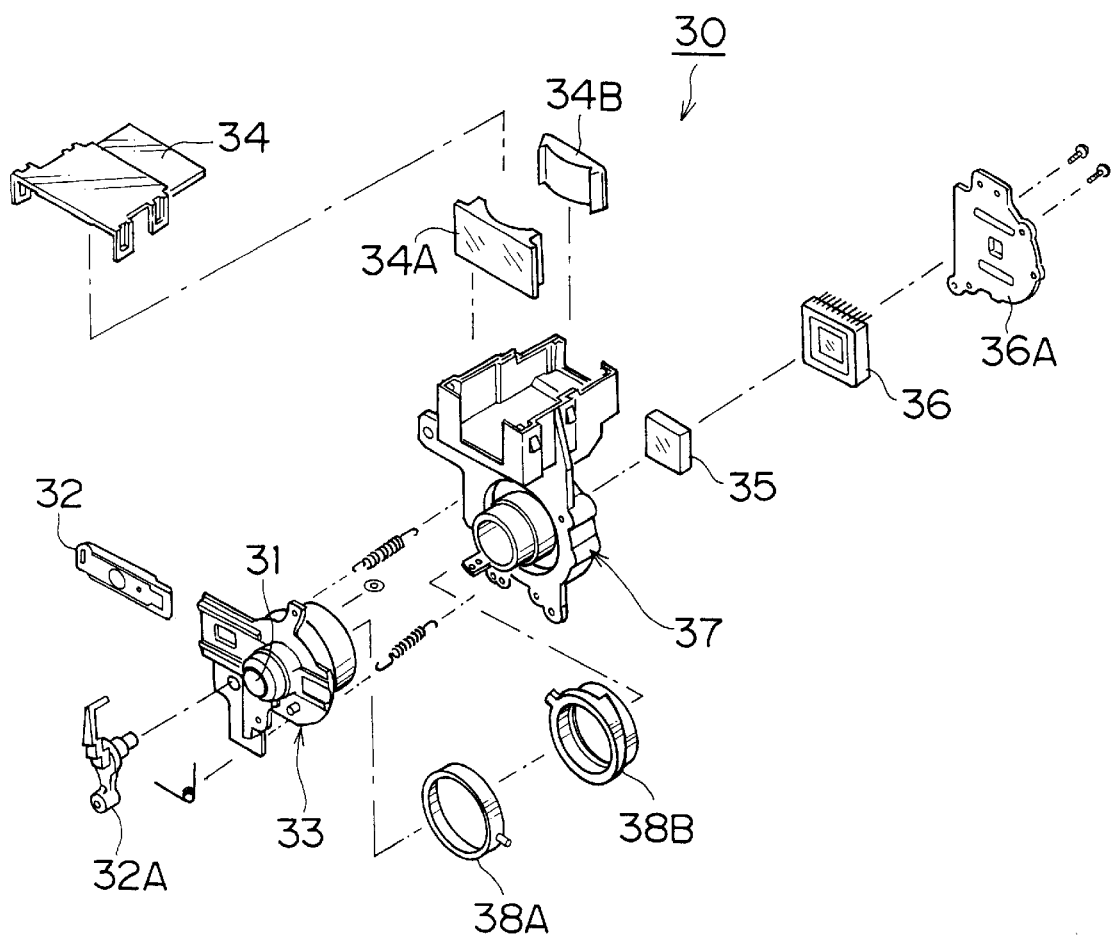

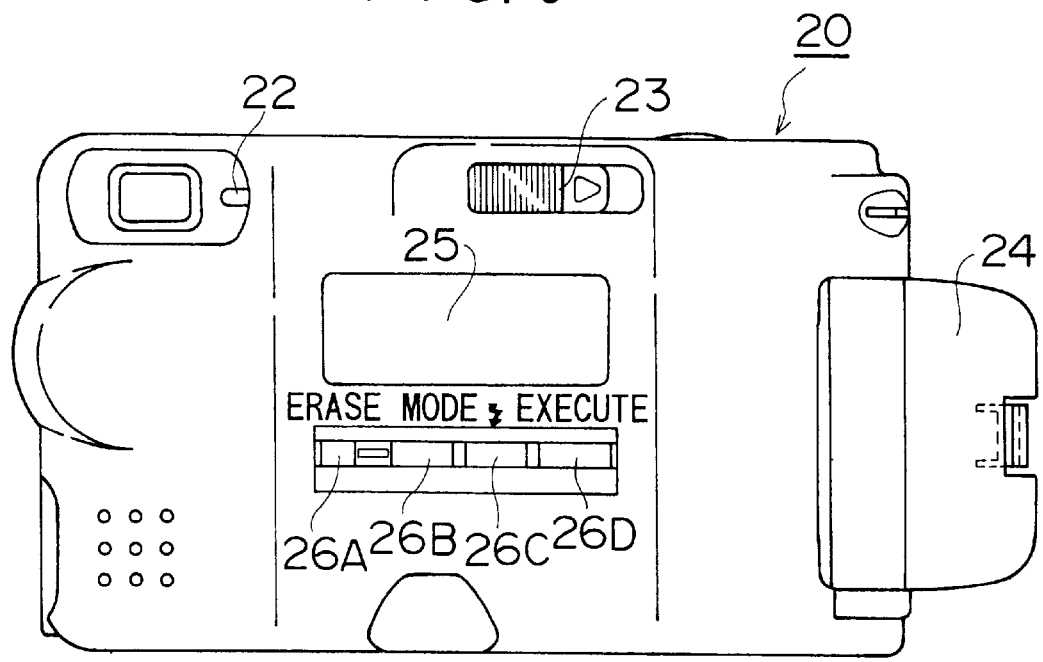
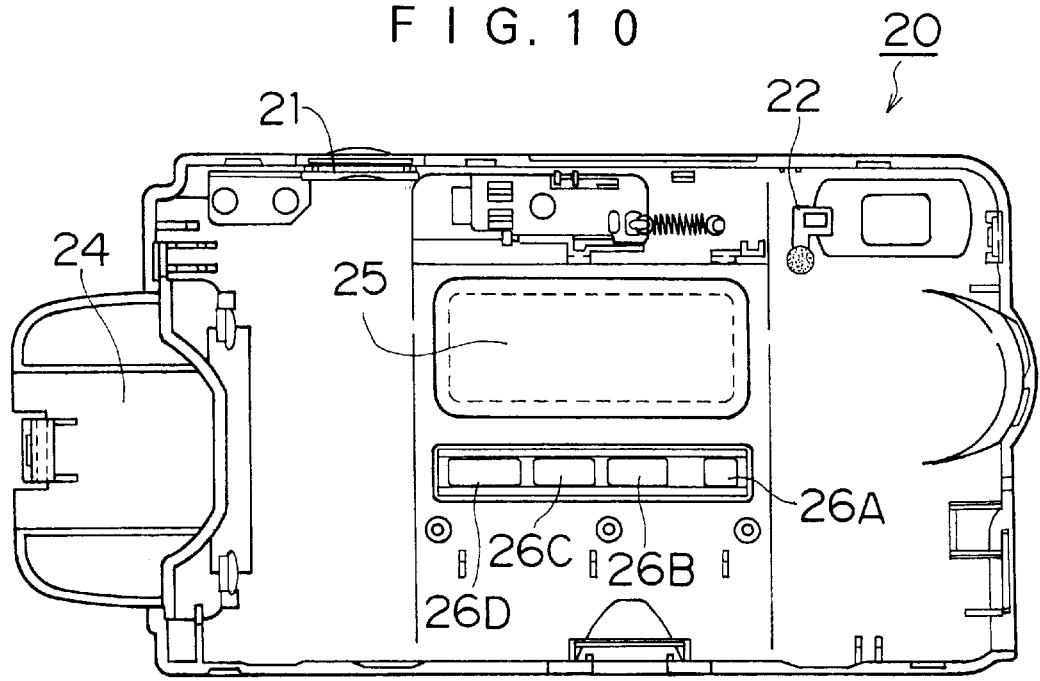

F I G. 1 6
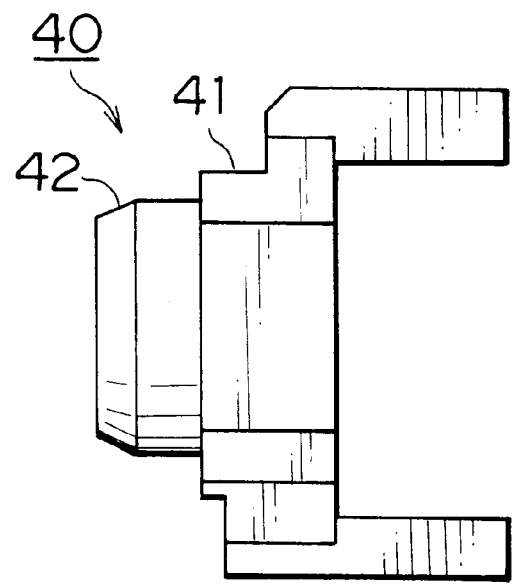
F I G. 1 7
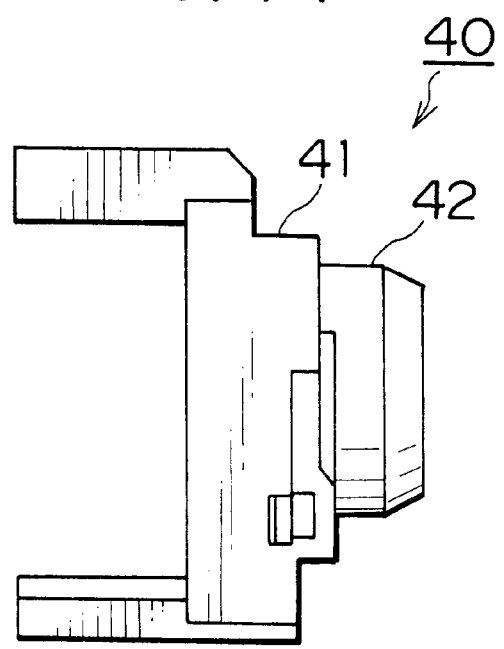

ELECTRONIC CAMERA WITH LIGHT TRANSMISSIBLE RESIN BODY

BACKGROUND OF THE INVENTION

1. Field of the Invention

The present invention relates generally to an electronic camera, and more particularly to an electronic camera which is provided with electronic imaging means such as a digital camera.

2. Description of Related Art

A digital camera receives light from a subject through a taking lens by means of an imaging device, and converts the light into an image signal, which is recorded on a recording medium. It is necessary to shield external or unnecessary (i.e., light other than the light from the subject) in order to prevent the imaging device from receiving such external or unnecessary light. There is known a digital camera which is provided with an electronic flash which detects an electronic flash light, which hits on the subject, by means of an electronic flash control sensor to automatically adjust the quantity of electronic flash emission light. It is necessary to prevent light other than the electronic flash light, which hits on the subject, from entering the electronic flash control sensor. Accordingly, an outer casing of the conventional digital camera is made of a material which never transmits light (a frame, a chassis, a case, a cover, etc. of the camera).

On the other hand, there is proposed a silver halide camera whose outer casing is made of a transparent material so that the interior of the camera can be seen through (Japanese patent provisional publication No. 5-45708). In the silver halide camera, a camera body which has a film chamber, and photographing functional parts such as a shutter member and a film feed member, which are directly attached to the camera body, have light-shielding properties. Structural members such as a gear base plate, a gear presser and a battery block, which are arranged outside the photographing functional parts, are made of transparent materials, and a transparent outer casing is provided outside the structural members. According to the silver halide camera, a film having light-shielding properties can shield unnecessary light completely, and the interior of the camera can be seen through as much as possible.

A conventional silver halide camera, however, is constructed in such a way that the camera body having the film chamber and the photographing functional parts have light-shielding properties. For this reason, if the outer casing such as a front cover is made of a transparent material, the interior of the camera can be seen through. If the structural members such as the gear base plate arranged outside the photographing functional parts are made of transparent materials, the interior of the camera is seen through the structural members made of the transparent materials.

On the other hand, a material which never transmits light is used for the outer casing of the digital camera, and there is no digital camera whose interior can be seen through. For this reason, the digital camera makes a stiff impression, and if a subject is a person, it is difficult to capture his or her natural or soft expression. If the outer casing is not transparent, openings must be formed in an area of the outer casing, which faces to an optical system, a liquid crystal display (LCD) or light emitting devices. A transparent cover for protection, a light guide, etc. must be provided in these openings. This results in an increase in the number of parts and assemblers. Moreover, the digital camera requires a battery and a recording medium, and if the outer casing is not transparent, a user sometimes fails to notice that the battery and the recording medium are not mounted in the camera until he or she starts photographing. Therefore, there is a possibility of missing a photographing opportunity.

SUMMARY OF THE INVENTION

An object of the present invention is to provide an electronic camera which prevents unnecessary light from entering an optical system and a photoelectric converter of the electronic camera, enables the interior of the camera to be seen through to reduce a stiff image of the electronic camera, and which enables movable parts such as a battery, a recording medium and a lens barrel mounted in the camera to be seen through an outer casing.

Another object of the present invention is to provide an electronic camera which enables characters and marks, printed on the outer casing, to be read in the dark, or which enables the position of the camera to be confirmed easily in the dark.

Another object of the present invention is to provide an electronic camera which enables light emitted by light emitting devices, provided in the camera, to be seen through the outer casing, thus omitting a light guide, etc., and in which a plurality of light emitting devices emit light to display the state of the camera.

To achieve the above-mentioned objects, the electronic camera, which has electronic imaging means, comprises: an outer casing made of light transmissible resin; and shielding means which prevents unnecessary light, which enters the camera through the outer casing, from entering an optical system and an through the outer casing. This enables the interior of the camera to be seen through the outer casing with functions of the electronic camera being maintained, and reduces the stiff image of the electronic camera. It is therefore possible to photograph a person's natural expression, and to see the workings of the recording medium, the battery or the movable inner mechanisms mounted in the electronic camera through the outer casing.

According to the present invention, the outer casing is provided with a liquid crystal display with backlight, and characters or marks are printed on a part of the outer casing in the vicinity of the liquid crystal display. The backlight of the liquid crystal display can illuminate the characters or marks through the outer casing. It is therefore possible to read the characters or marks for confirming functions of an operating switch in the dark.

A fluorescent material is added to the resin of the outer casing, or the fluorescent material is applied or attached to the outer casing and the parts built in the camera. This enables the camera to emit light with an electronic flash light thereof, and informs a person as a subject of the position of the camera even in the dark.

Moreover, the outer casing is provided with a slit, into which a sheet material such as a decoration sheet, a name sheet and a spare recording medium is inserted. The sheet material inserted into the slit can be seen through the outer casing.

According to the present invention, the electronic camera provided with the electronic imaging means is characterized in that the outer casing of the electronic camera is made of light transmissible resin, and there is provided a light shielding means between the light emitting means of the electronic camera and the outer casing which the light enters from the light emitting means in order to prevent the light from the light emitting means from entering the optical system of the electronic camera and the photoelectric converter through the outer casing. This prevents the unnecessary light from the light emitting means such as the electronic flash from entering the optical system of the electronic camera and the photoelectric converter, if the outer casing is transparent. The interior of the camera can be seen through while the functions of the electronic camera are maintained.

According to the present invention, the camera provided with the electronic imaging means is characterized in that the outer casing of the camera is made of the light transmissible resin, and a part of the outer casing, which faces to the light emission means provided in the camera, is thinner than the other parts of the outer casing. This enables light emitted by the light emitting devices to be seen through the outer casing without the necessity of providing the light guide, etc. in the outer casing. In particular, since the part of the outer casing, which faces to the light emission means, is thinner than the other parts, it is possible to secure a sufficient amount of light without reducing the strength of the outer casing and identify the display part from the surface of the outer casing.

According to another embodiment of the present invention, the camera provided with the electronic imaging means is characterized in that the outer casing thereof is made of light transmissible resin to enable the light emitted by a plurality of light emitting devices provided in the camera to be seen through the outer casing, and that the plurality of light emitting devices emit light to display the state of the camera. Thus, the light emitted by the plurality of light emitting devices can be seen through the outer casing without the necessity of providing the light guide, etc. in the outer casing, and the plurality of light emitting devices emit light to display the state of the camera (e.g. from the start of recording till the completion thereof).

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is an exploded perspective view of a lens/finder unit in FIG. 2;

FIG. 9 is a front view of a rear chassis in accordance with the present invention;

FIG. 10 is a back view of a rear chassis in accordance with the present invention;

FIG. 16 is a right side view of a shielding cover in accordance with the present invention;

FIG. 17 is a left side view of a shielding cover in accordance with the present invention;

DETAILED DESCRIPTION OF THE PREFERRED EMBODIMENT

This invention will be described in further detail by way of example with reference to the accompanying drawings.

Figure 1:
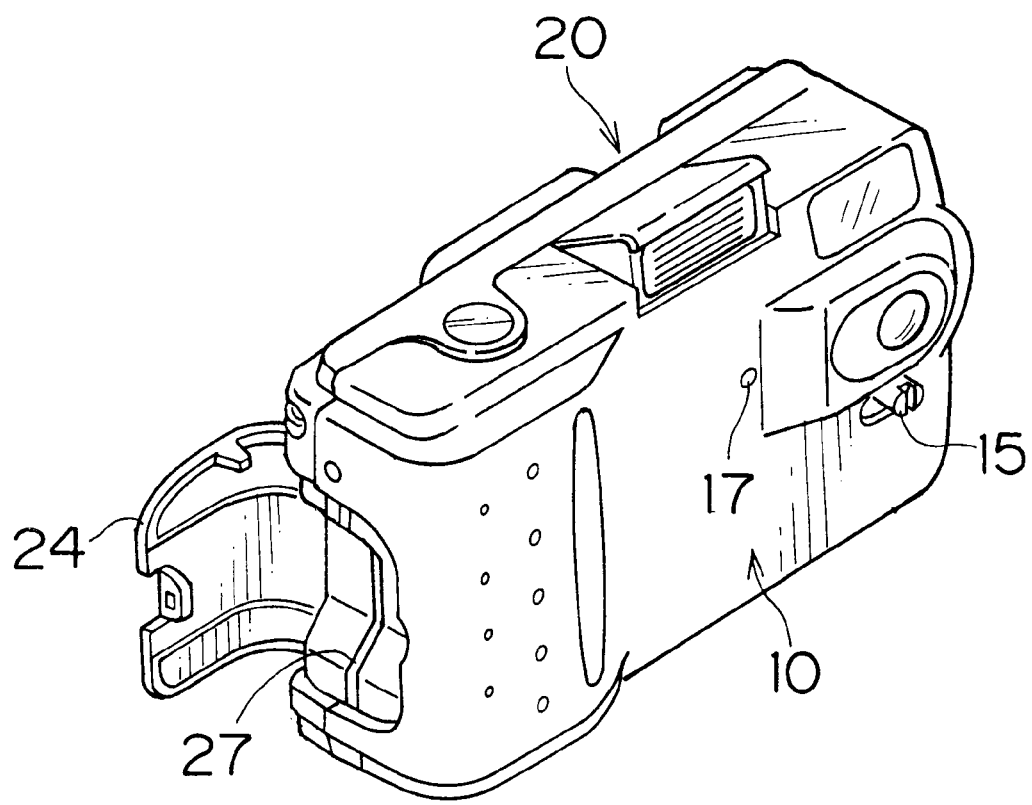
FIG. 1 is a perspective view of an electronic camera in accordance with the present invention.
Figure 2:
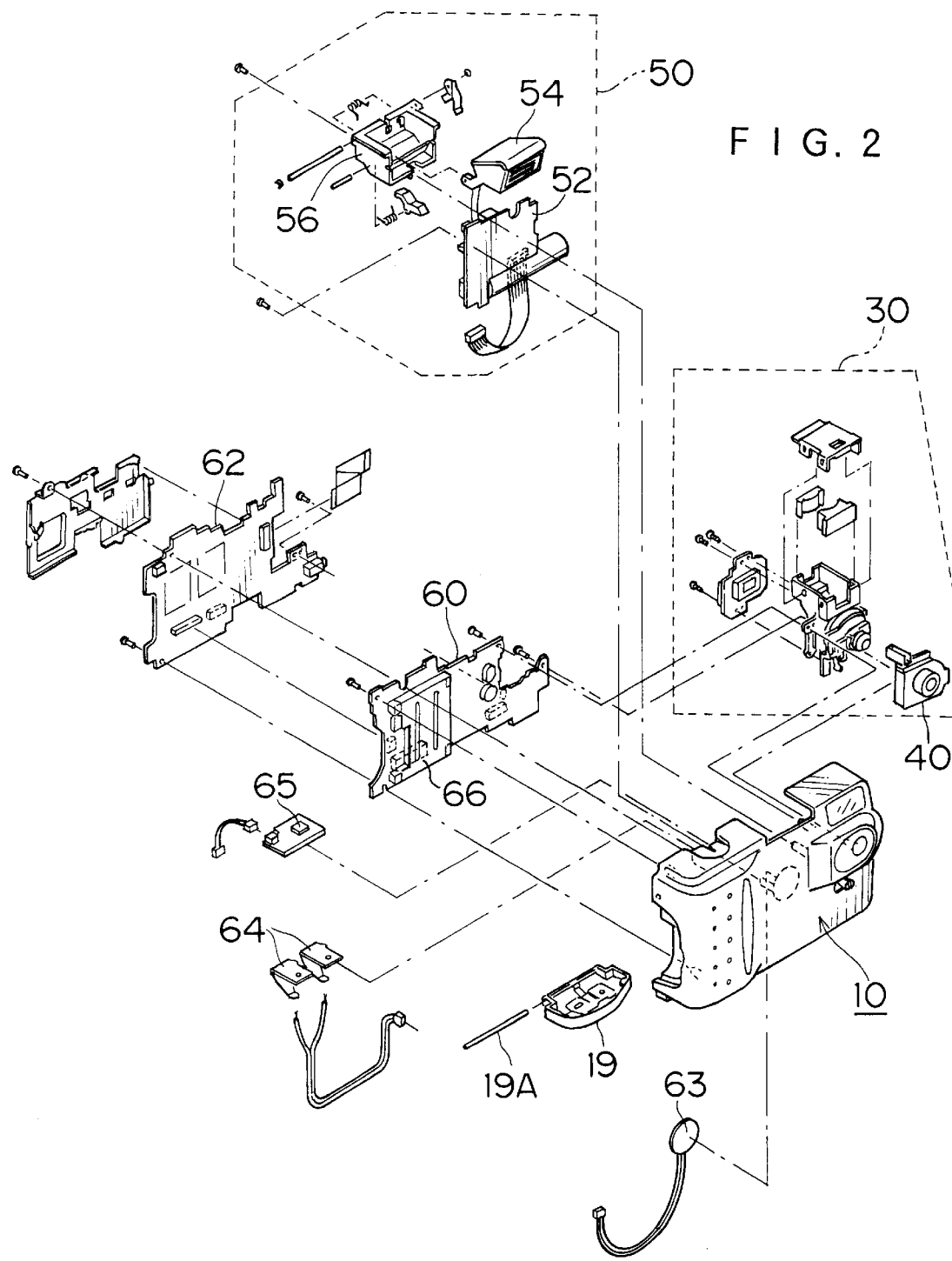
FIG. 2 is an exploded perspective view illustrating the inner structure of an electronic camera in accordance with the present invention.
Figure 3:
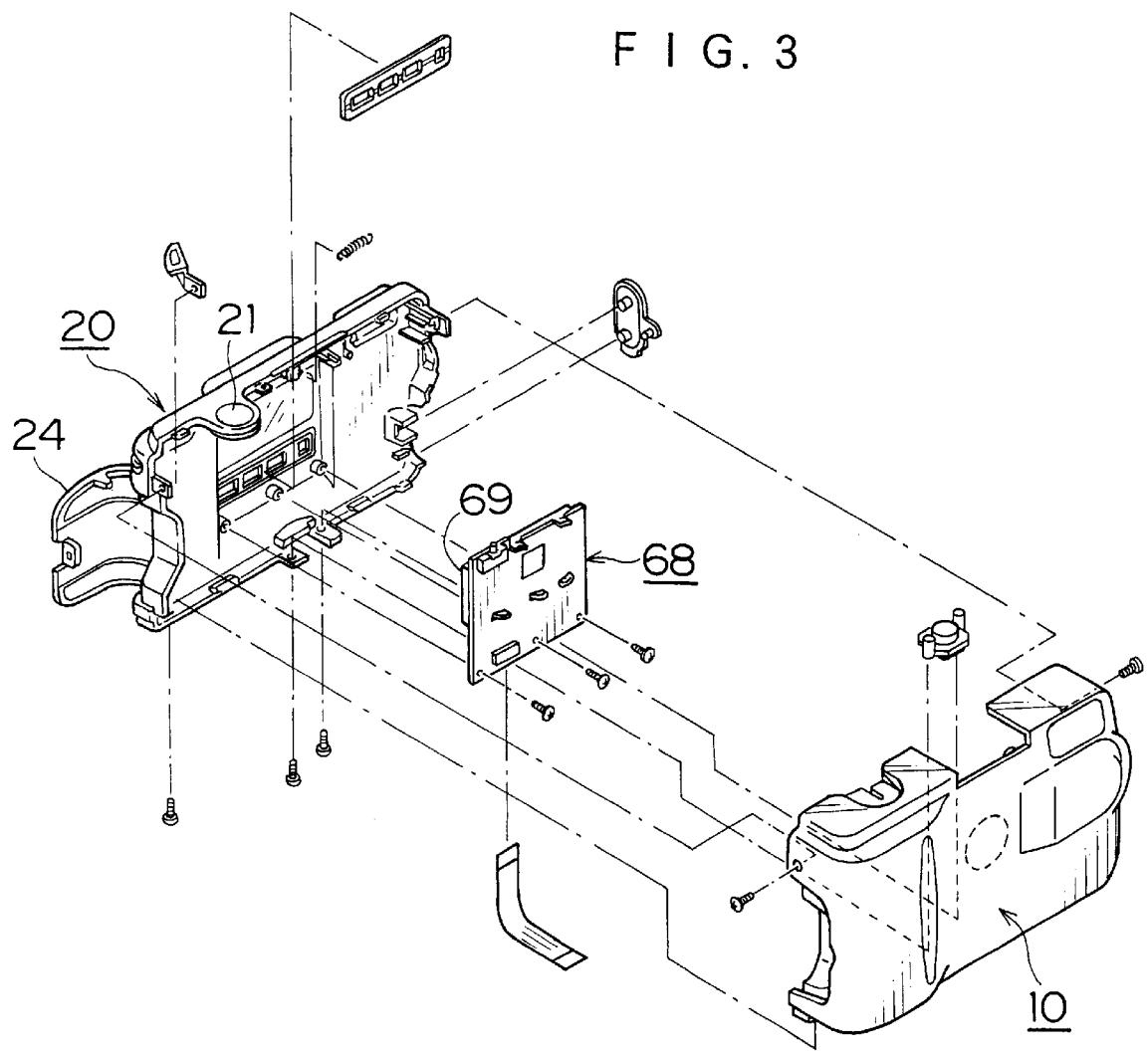
FIG. 3 is an exploded perspective view illustrating the inner structure of an electronic camera in accordance with the present invention.

FIG. 1 is a perspective view illustrating an embodiment of an electronic camera according to the present invention. FIGS. 2, 3 and 4 are exploded perspective views illustrating the inner structure of the electronic camera in FIG. 1.

As shown in the drawings, the electronic camera is comprised mainly of an outer casing (a front chassis 10 and a rear chassis 20), a lens/finder unit 30, a shielding cover 40, an electronic flash unit 50, a recording medium circuit board 60, a main circuit board 62, and a liquid crystal unit 68.

Both the front chassis 10 and the rear chassis 20 are made of light transmissible resin. The light transmissible resin is not necessarily colorless and transparent, but it may be semitransparent or light-colored if the interior of the camera can be seen through.

Figure 5:
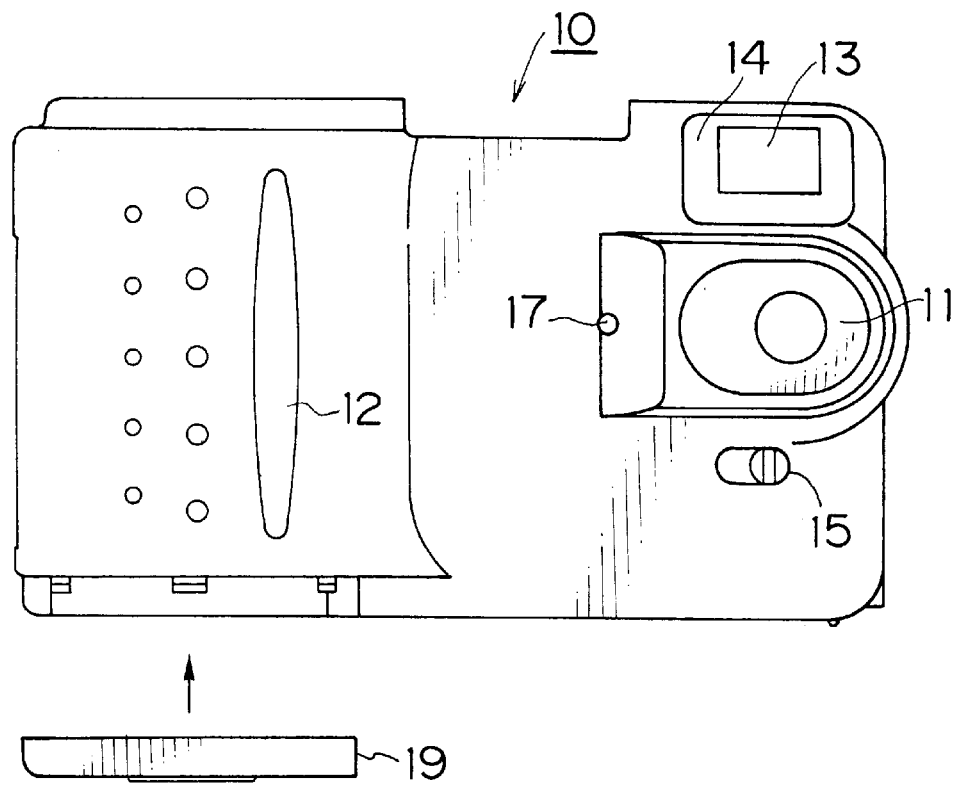
FIG. 5 is a front view of a front chassis of an electronic camera in accordance with the present invention.
Figure 6:
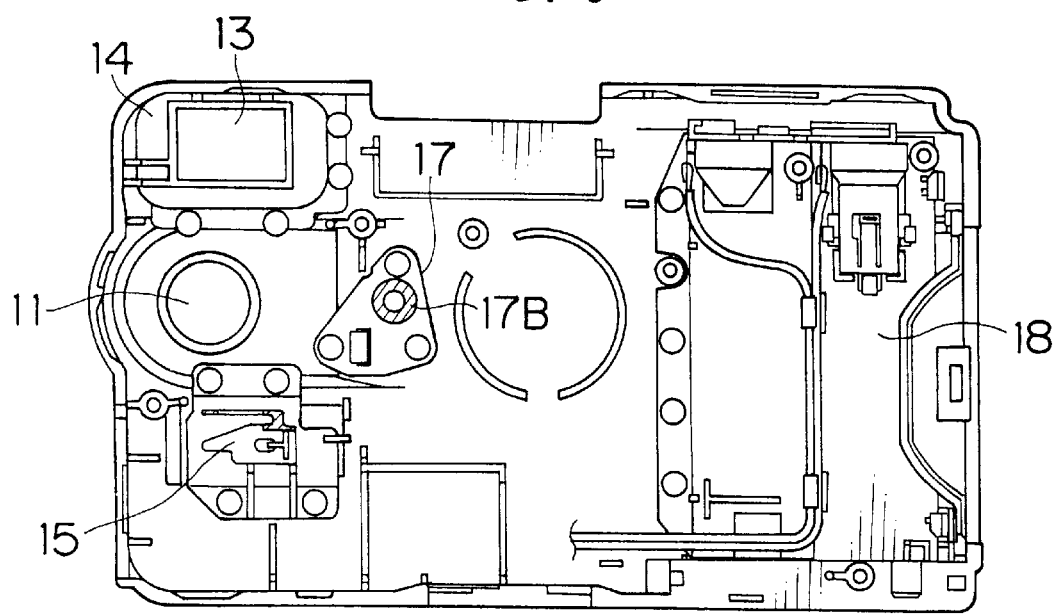
FIG. 6 is a back view of a front chassis of an electronic camera in accordance with the present invention.
Figure 7:
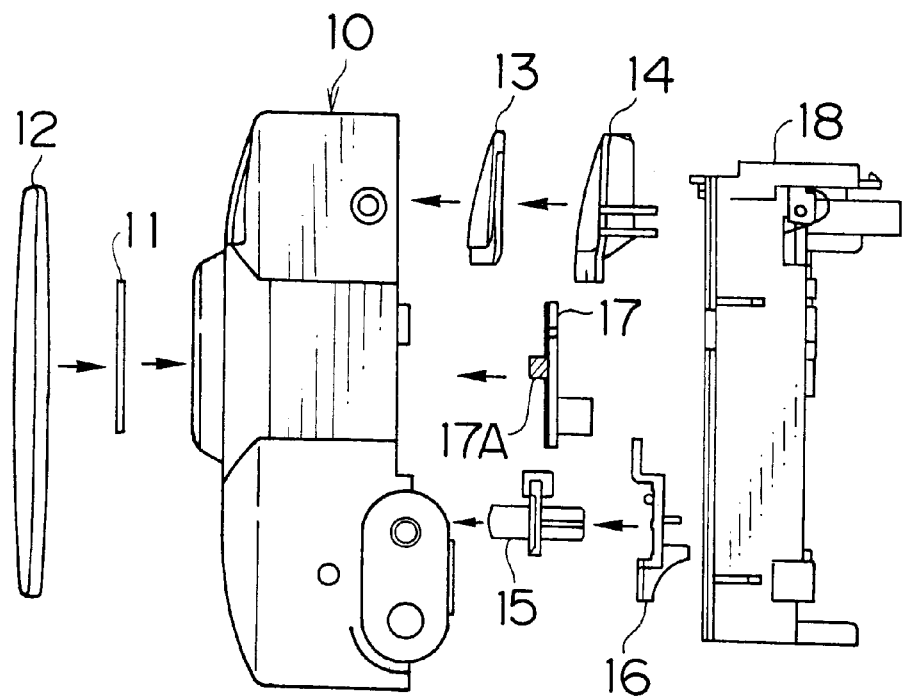
FIG. 7 is a right side view of a front chassis of an electronic camera in accordance with the present invention.

FIGS. 5, 6, 7, and 8 are a front view, a back view, a right side view and a bottom view, respectively, of the front chassis 10. As shown in FIGS. 5 and 7, a lens protection cover 11 and a grip rubber 12 are attached on the front face of the front chassis.

As shown in FIGS. 6 and 7, a finder hood 14 is welded into the interior of the front chassis 10 through a finder cover 13. An iris switching lever 15 is incorporated into the front chassis 10, and a guide member 16 is welded on the iris switching lever 15. A light guide 17 and a battery holder 18 are further welded on the guide member 16.

A light guide 17 guides light from a subject to a sensor (not shown) which controls the electronic flash, and a columnar projection 17A of the light guide 17 is engaged with a hole in the front chassis 10. The sides of the columnar projection 17A of the light guide 17, and the surface thereof which faces to the front chassis 10 are masked, so that the electronic flash light, etc. can be prevented from entering the light guide 17 through the interior and section of the front chassis 10. A clearance between the light guide 17 and the above-mentioned sensor is covered with a light transmissible cushioning material 17B (see FIG. 6) in the form of a ring. This prevents light from entering the light guide 17 from the side of the sensor.

Figure 8:
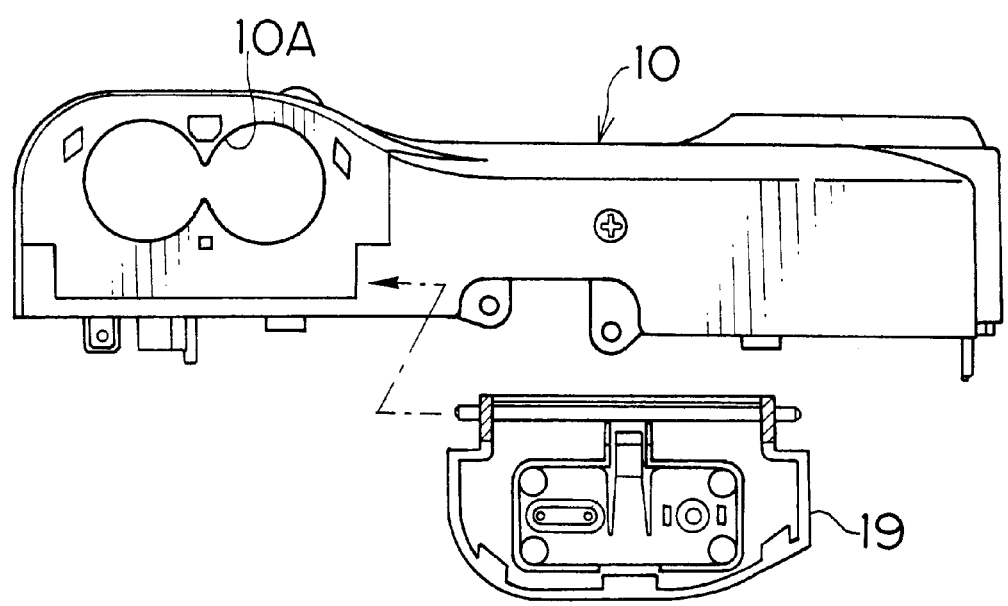
FIG. 8 is a bottom view of a front chassis of an electronic camera in accordance with the present invention.
Figure 11:
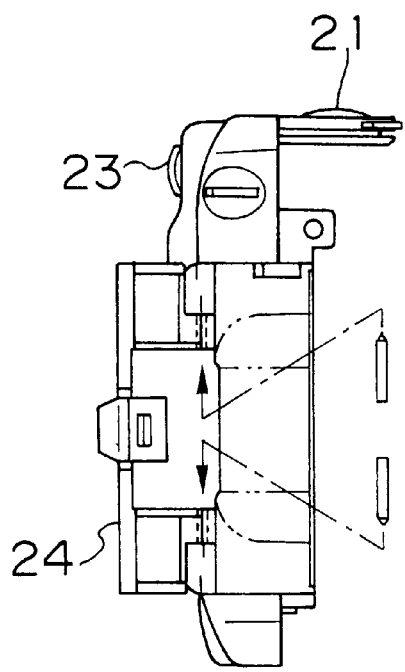
FIG. 11 is a right side view of a rear chassis in accordance with the preset invention.
Figure 12:
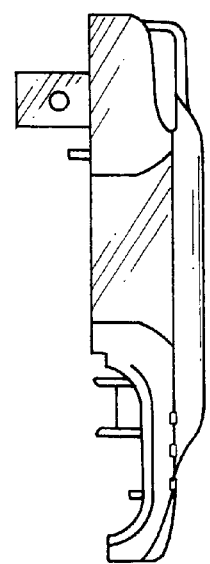
FIG. 12 is a left side view of a rear chassis in accordance with the present invention.
Figure 13:
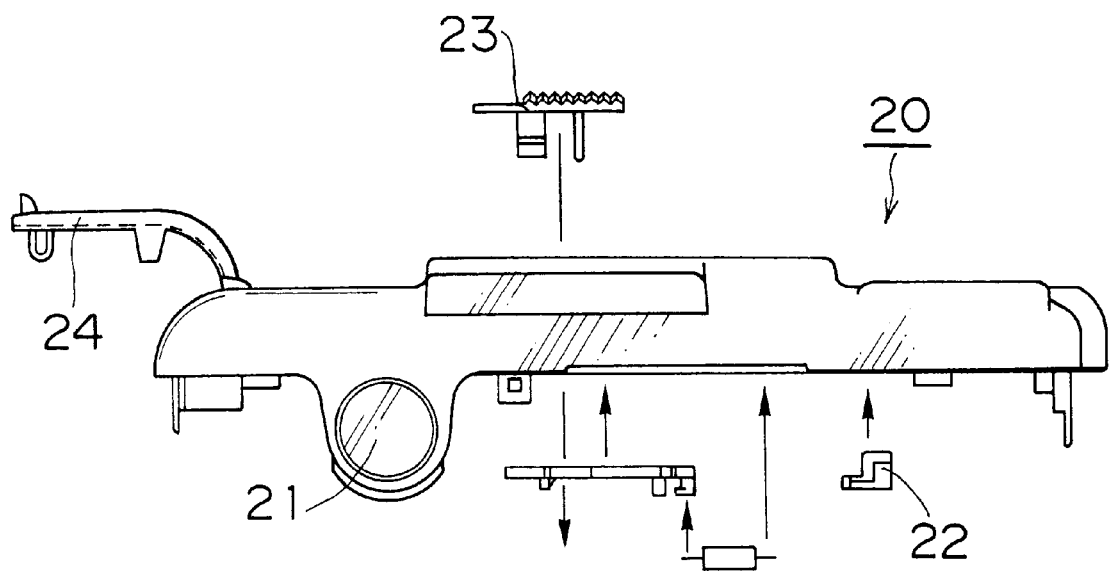
FIG. 13 is a plan view of a rear chassis in accordance with the present invention.
Figure 14:
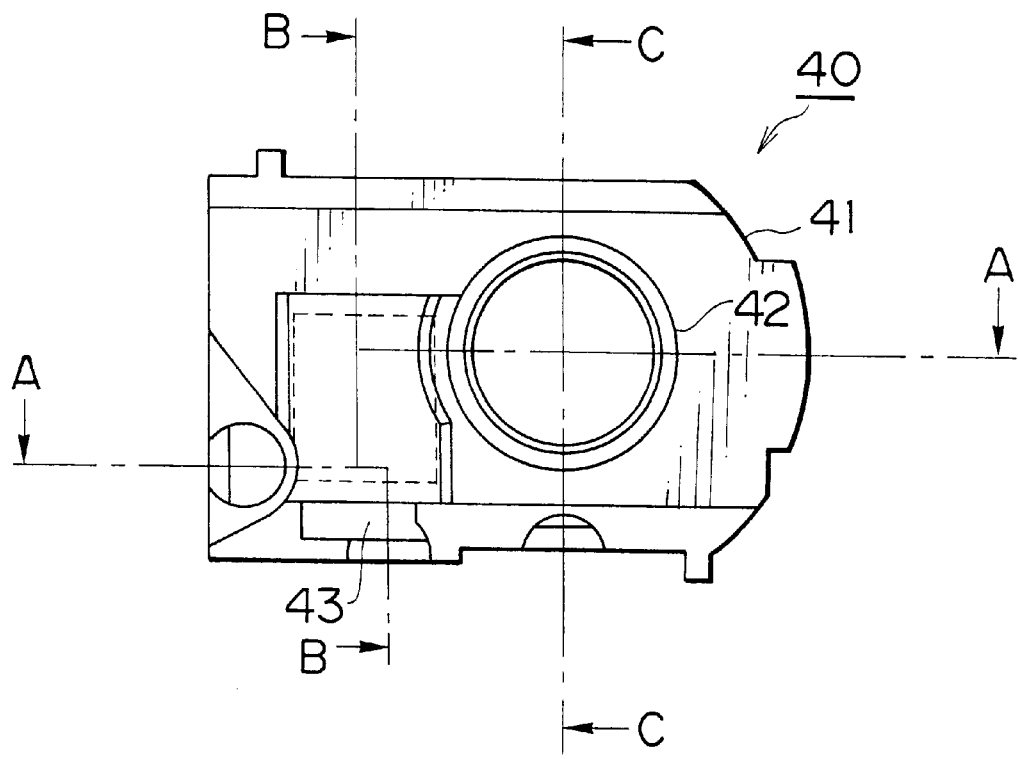
FIG. 14 is a front view of a shielding cover in accordance with the present invention.
Figure 15:
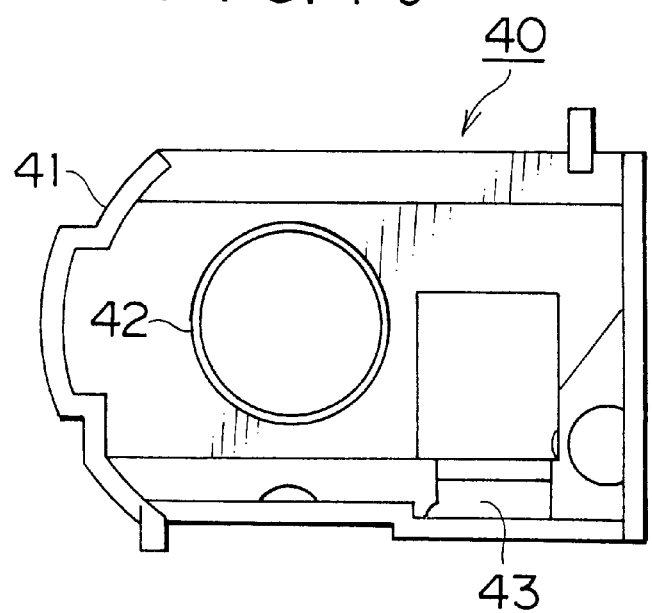
FIG. 15 is a back view of a shielding cover in accordance with the present invention.
Figure 18:
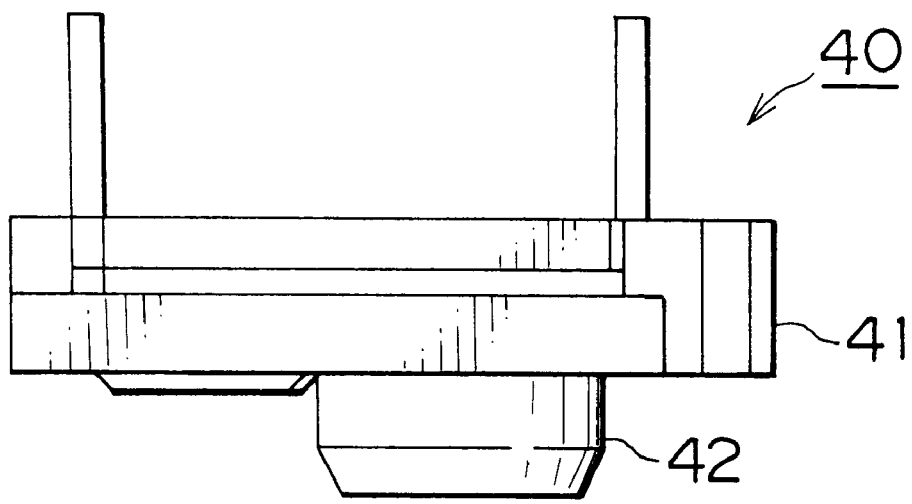
FIG. 18 is a plan view of a shielding cover in accordance with the present invention.
Figure 19:
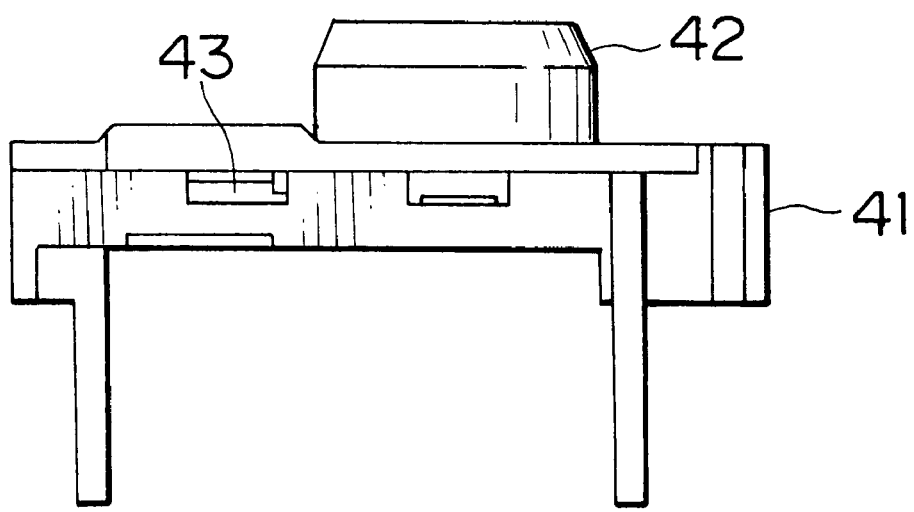
FIG. 19 is a bottom view of a shielding cover in accordance with the present invention.

A battery housing is constructed by the battery holder 18 and the front chassis 10. The front chassis 10 partially guides the battery as shown in FIG. 8, and a rib 10A is formed on the front chassis 10 to strengthen the housing. The rib 10A, or another rib or boss, which is formed on the front chassis 10, can be seen through the front chassis 10, and they function as the interior design of the camera. A battery cover 19 is openably provided at the bottom of the front chassis 10 with support of a pivot 19A, and the battery cover 19 is made of the light transmissible resin as is the case with the front chassis 10.

FIGS. 9, 10, 11, 12, and 13 are a front view, a back view, a right side view, a left side view, and a plan view, respectively, of the rear chassis 20. As shown in these drawings, an end of a cantilever-shaped key top 21, and a light guide 22 which guides light from a light emitting diode (not shown) displaying the inner state of the camera are welded to the rear chassis. A control 23 of the power switch is slidably arranged on the rear chassis 20. The electronic camera uses a memory card (Smart Medium (solid state Floppy Disc Card)) as a recording medium, and a card cover 24 is openably provided at the rear chassis. The card cover 24 opens and closes a card insertion opening for the memory card. The card cover 24 is made of the light transmissible resin as is the case with the rear chassis 20.

Reference numeral 25 is a display window which faces to a display part of a liquid crystal display (LCD) 69 with backlight in the liquid crystal unit 68 (see FIG. 3). Reference numerals 26A, 26B, 26C and 26D are openings which face an erasing button, a mode button, an electronic flash button and an execution button, respectively. As shown in FIG. 9, characters and marks are printed at the top of those openings 26A, 26B, 26C and 26D. Since they are printed in an area to which light leaks from the backlight of the LCD 69, they are illuminated from the interior of the rear chassis 20 so that it can be read in the dark. Of course, the light may be guided by the light guide, etc. from the backlight of the LCD 69 to an area where the characters and marks are printed.

As shown in FIG. 2, the electronic flash unit 50 is comprised mainly of an electronic flash circuit board 52, an electronic flash body 54 provided with a discharge tube, and a housing part 56 which retractably holds the electronic flash body 54. The top of the electronic flash body 54 (a plane which is flush with the top of the front chassis 10 when the electronic flash body 54 is housed in the front chassis 10) is made of the light transmissible resin as is the case with the front chassis 10. The housing part 56 is composed of a shielding member.

The lens/finder unit 30 whose front face is covered with the shielding cover 40 as shown in FIG. 2, the electronic flash unit 50, the recording medium circuit board 60, the main circuit board 62, or the like are fixed to the front chassis 10. The lens/finder unit 30 and the shielding cover 40 will be described later in further detail. In FIG. 2, reference numerals 63 is a buzzer, 64 is an armature which connects to the battery, 65 is a shutter release switch, and 66 is a card connector in which the memory card is mounted.

On the other hand, the liquid crystal unit 68, etc. are fixed to the rear chassis 20 as shown in FIG. 3. As described previously, the LCD with backlight 69 is provided on the circuit board of the liquid crystal unit 68, and a power switch which is turned on and off based on the sliding action of a control 23 of the power switch, an erasing button, a mode button, an electronic flash button and an execution button are additionally provided on the circuit board of the liquid crystal unit 68. The electronic flash body 54 of the electronic flash unit pops up in connection with the sliding action of the control thereof.

Then, the front chassis 10 is secured to the rear chassis 20, and the assembly of the camera is completed. As shown in FIG. 1, a slit (a card insertion opening) 27 is formed between the front chassis 10 and the rear chassis 20. Inserting the memory card into the card insertion opening 27 mounts the memory card in the card connector 66.

FIG. 4 is an exploded perspective view of the lens/finder unit 30.

As shown in FIG. 4, the lens/finder unit 30 is composed of a first lens barrel 33 and a second lens barrel 37. The first lens barrel 33 is provided with a lens 31 and an aperture mechanism which has an aperture plate 32. A finder, which has an objective lens 34A and an eyepiece 34B, is provided at the top of the second lens barrel 37, and an optical filter 35 and an imaging device 36 are inserted into and fixed to the back of the second lens barrel 37. In FIG. 4, reference numeral 34 is a finder cover which fixes the lens 34A and the eyepiece 34B. Element 36A is a base plate for fixing the imaging device 36, and 38A, 38B are spacers for maintaining an interval between the lenses.

The diaphragm plate 32 has large and small apertures, and it slides horizontally with support of a lever 32A which connects to the iris switching lever 15. One of the two apertures is moved onto an optical axis of the lens 31.

In the lens/finder unit 30, the first lens barrel 33 is engaged with the second lens barrel 37 with light-shielding properties, and the light is shielded between the second lens barrel 37 and the imaging device 36. Since there is a small gap between the diaphragm plate 32 and the first lens barrel 33, the light enters the lens barrel through the gap if the front chassis 10 and the rear chassis 20 are transparent. There is a small gap between the lens 31 and the protection cover 11. The light which enters the camera through the front chassis 10 and the rear chassis 20 is reflected on the protection cover 11, and enters the lens 31.

According to the present invention, the shielding cover 40 (see FIG. 2) is arranged at the front of the lens/finder unit 30 in order to shut out the unnecessary light.

Figure 20:
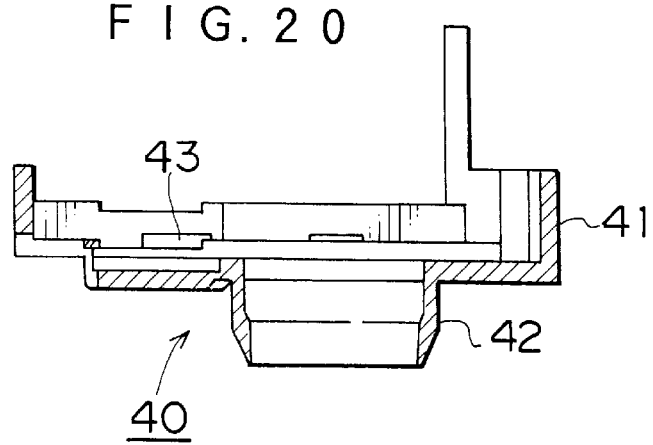
FIG. 20 is a sectional view taken along line A—A of FIG. 14.
Figure 21:
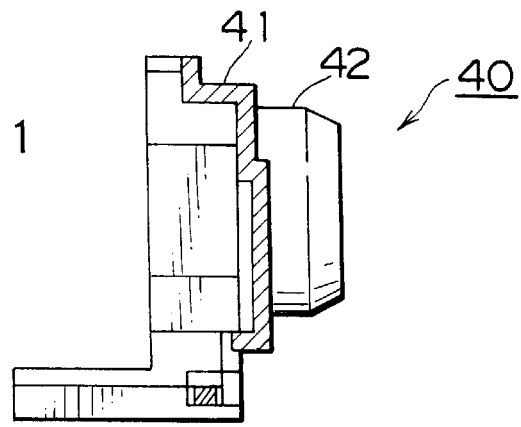
FIG. 21 is a sectional view taken along line B—B of FIG. 14.
Figure 22:
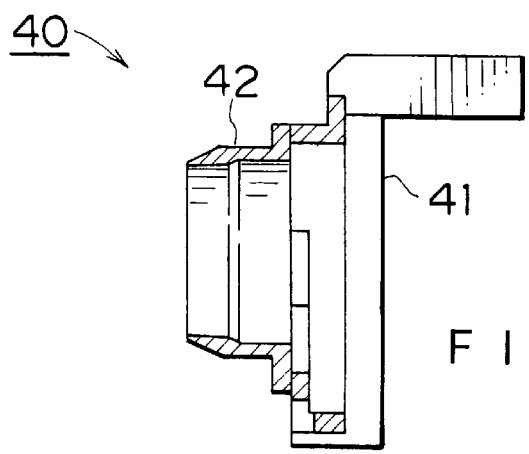
FIG. 22 is a sectional view taken along line C—C of FIG. 14.

FIGS. 14, 15, 16, 17, 18 and 19 are a front view, a back view, a right side view, a left side view, a plan view and a bottom view of the shielding cover 40. FIGS. 20, 21 and 22 are sectional views taken along lines A—A, B—B, and C—C, respectively, in FIG. 14.

As shown in the drawings, the shielding cover 40 is made of resin which has light-shielding properties so as to cover the diaphragm mechanism including the lens 31 and the diaphragm plate 32. The shielding cover 40 has a cover body 41 which covers the diaphragm mechanism including the diaphragm plate 32, and a cylindrical part 42 into which the lens 31 is inserted. Relief holes 43 are formed in the cover body 41 so as to prevent the cover body 41 from interfering with the lever 32A connected to the diaphragm plate 32.

The shielding cover 40 is fixed to the front chassis 10 in such a way that the end of the cylindrical part 42 comes into contact with the protection cover 11. This causes the cylindrical part 42 to shut out the light, which enters the camera, through the front chassis 10 and the rear chassis 20. The light never enters the protection cover 11 inside the cylindrical part 42.

The cover body 41 of the shielding cover 40 covers a movable part of the diaphragm mechanism including the diaphragm plate 32 (or a gap in the lens barrel itself), and therefore, the light, which enters the camera, through the front chassis 10 and the rear chassis 20 does not enter the lens barrel from the side of the lens barrel.

Figure 23:
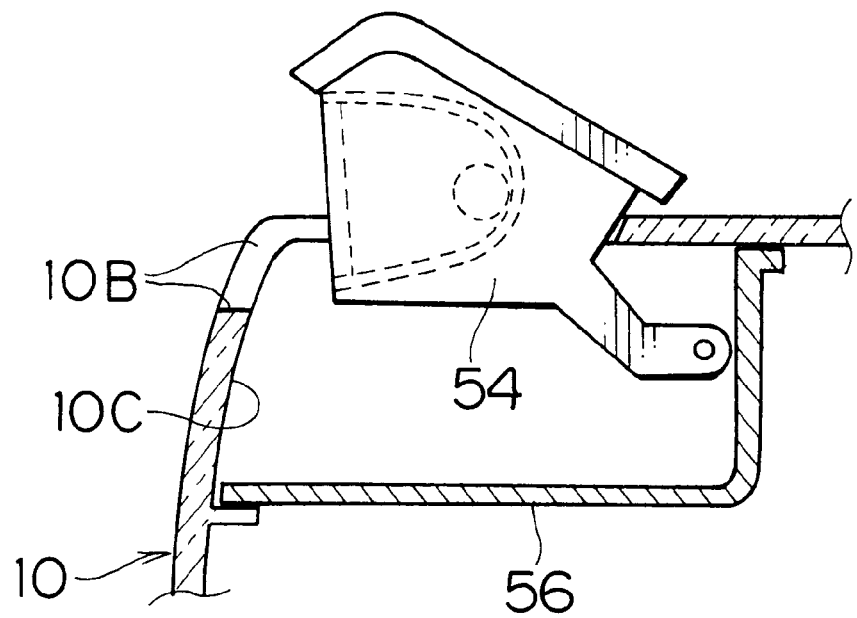
FIG. 23 is a side view including a partial section in a vicinity of an electronic flash unit.

FIG. 23 is a side view including a partial section of the vicinity of the electronic flash unit, showing the state wherein the electronic flash body 54 pops up.

As shown in FIG. 23, a flash from the electronic flash body 54 partially enters an end face 10B of the front chassis 10 located in front of the electronic flash body 54, and a reverse side 10C (see FIG. 5) of the front chassis 10 located in front of the electronic flash body 54. The present invention provides the end face 10B and the reverse side 10C of the front chassis 10 with the light-shielding properties.

To shield light, another light-shielding member (resin, paper and metal) is added, a silk printing is performed, the chassis is double-molded with a light-shielding material, a light shielding material is insert-molded, a surface is formed to be diffusive (crimped or carved), the chassis is made thinner, or the like.

Since the housing part 56 which contains the electronic flash body 54 is made of the light-shielding member as described with reference to FIG. 2, the flash does not leak from the housing part 56 into the camera.

As stated above, the front chassis 10 is partially provided with the light-shielding properties (the end face 10B and the reverse side 10C), and such a part of the front chassis 10 is equivalent to an opaque chassis. This prevents the flash of the electronic flash from entering the electronic flash control sensor, the light guide 17, the lens 31, and the imaging device 36 in the camera through the front chassis 10. The electronic flash is movable and it may also be fixed.

The light emission means is not restricted to the above-mentioned electronic flash, but it includes emission display devices such as a light emitting diode (LED), a display tube and a lamp which are arranged in proximity to a light receiving device. In this case, the light from the emission display devices are shielded so as not to enter the light receiving device.

Figure 24:
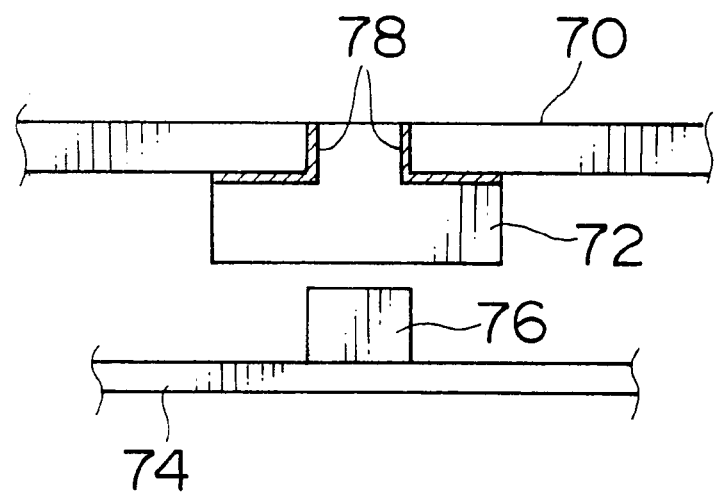
FIG. 24 is a view of assistance in explaining a light shielding means arranged between a transparent chassis and a light guide which guides light to an LED.

Specifically, as shown in FIG. 24, a light guide 72 is engaged with a hole punched in a part of a transparent chassis 70. In order to guide light from the LED 76 attached to a circuit board 74 to the outside of the transparent chassis 70 through the light guide 72, a light shielding means 78 is provided between the transparent chassis 70 and the light guide 72 to prevent the light from the LED 76 from entering the light receiving device through the transparent chassis 70.

If the light guide 72 is not attached to the transparent chassis 70, it is possible to see the light from the LED 76. If the light guide 72 is attached to the chassis 70, it is possible to provide the above-mentioned light shielding means 78 and secure a sufficient amount of transmitted light even if the transparent chassis 70 is semitransparent or colored.

FIG. 25 shows another embodiment of the present invention. As shown in FIG. 25, a light from an LED 88, attached to a circuit board 86, can be seen from the outside through transparent chassiss 80, 82, 84. In the transparent chassiss 80, 82, 84 of this embodiment, parts through which the light is desired to be transmitted are thinner than the other parts of the chassis. This makes it possible to secure a sufficient amount of transmitted light without reducing the strength of the transparent chassis as a whole. The thin parts can be distinguished from the other parts (they are identified as display parts).

Figure 25A:
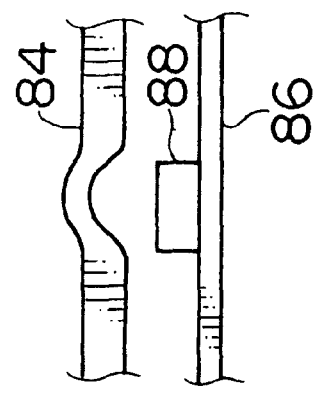
FIGS. 25(A), 25(B) and 25(C) are views of assistance in explaining the shape of a transparent chassis which faces to an LED.
Figure 25B:
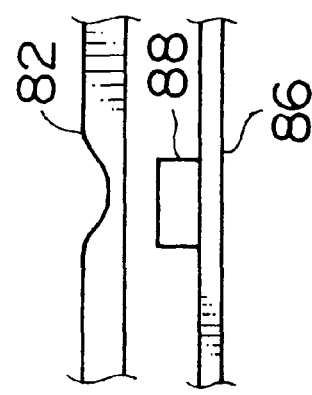
Figure 25C:
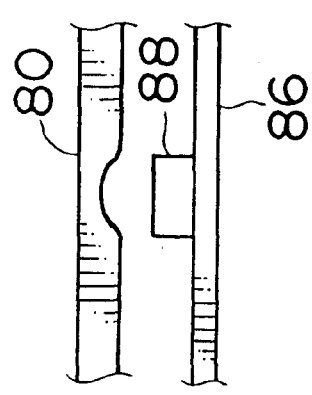

The transparent chassis 80 in FIG. 25(A) and the transparent chassis 82 in FIG. 25(B) are planoconcave to be thinner than the outside of the transparent chassis 80 plane, and the outside of the transparent chassis 82 is concave. The transparent chassis 84 in FIG. 25(C) is concavoconvex; the outside of the transparent chassis 84 is convex.

Figure 26:
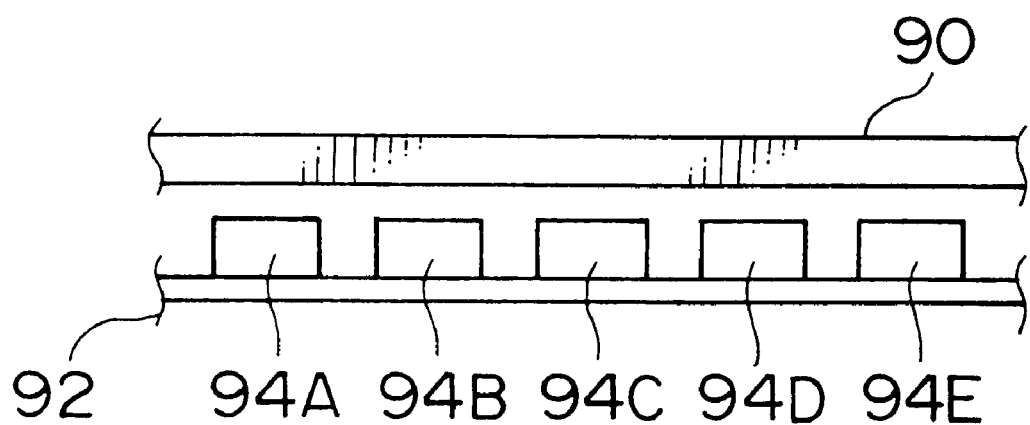
FIG. 26 is a view showing a plurality of LEDs which are arranged in such a way as to face the transparent chassis.

FIG. 26 shows another embodiment of the present invention. As shown in FIG. 26, it is possible to see light from a plurality of light emitting diode 94A–94E, attached to a circuit board 92, through a transparent chassis 90. In particular, it is possible to display the state of the camera with the light emitted by the plurality of LEDs 94A–94E.

For instance, the plurality of LEDs 94A–94E are blinked in a fixed pattern during recording, and the LEDs 94A–94E are lighted or blinked by turns from the start of recording until the completion thereof. It is possible to display the charged state of the electronic flash, the residual amount and charged state of the battery, as well as the recording action of the camera. The number of light receiving devices is not restricted to this embodiment, and the arrangement of light emitting devices is not restricted to a straight line; the light emitting devices may be arranged in a circle.

The use of the transparent chassis enlarges the range of attachment positions of the light emitting devices on the circuit board. In the case of an opaque chassis, a hole is punched in a part of the transparent chassis, and a transparent member (a light guide) is inserted into the part. Further, the transparent chassis must be aligned with the circuit board. In the case of the transparent chassis, however, the light emitting devices may be illuminated from almost anywhere to enable the light emitting devices to be seen from outside.

A description will be given of the operation of the electronic camera which is constructed in the above-mentioned manner.

Since the front chassis 10 and the rear chassis 20 are made of light transmissible resin, the external light and the electronic flash light enter the electronic camera through the front chassis 10 or the rear chassis 20, but the light shielding cover 40 shuts out such unnecessary light. For this reason, no unnecessary light is reflected on the protection cover 11 to enter the lens barrel, or enters the lens barrel through the gaps therein. The light guide 17 which guides the electronic flash light to the electronic flash control sensor is masked, and the gap between the light guide 17 and the electronic flash control sensor is covered with the light-shielding cushioning material 17B in the form of a ring. This prevents the electronic flash light from entering the electronic flash control sensor through the interior and section of the chassis. The amount of the light emission of the electronic flash is controlled satisfactorily. In this embodiment, the opaque protection cover 11, the masking coating and the light-shielding cushioning material 17B are used for the light shielding means, but the light-shielding paper or other light shielding members may also be used.

A part of the transparent front chassis 10 constructs the housing for the battery, and the card cover 24, which opens and closes the card insertion opening of the memory card, is made of the light transmissible resin. It is therefore possible to confirm whether the battery and the memory card are mounted in the camera from the outside of the camera.

Moreover, the insertion of a decoration sheet or a name sheet into the housing for the battery makes it possible to distinguish the electronic camera from other electronic cameras of the same type. The transparent outer casing may be provided with the same slit as the card insertion opening 27 of the memory card in FIG. 1 so that the spare memory card, the decoration sheet and the name sheet can be inserted into the slit.

Furthermore, a fluorescent material may be added to the resin of the transparent outer casing, or a fluorescent member may be applied or attached to the outer casing or parts built in the camera. This enables the camera to emit light with the electronic flash light thereof, the external light, or the like and to inform a person as a subject of the position of the camera.

The taking lens of this embodiment is a fixed-focus pan-focus lens, and the lens barrel is provided with the switchable diaphragm mechanism. The present invention, however, is not restricted to this. The lens barrel may be provided with a telephoto/wide switching function or an AF function, for example. Further, the lens barrel may be attached to the side of the outer casing, so that the workings of the lens barrel can be seen through the outer casing.

In this embodiment, the existing die is used, and the front chassis 10 and the rear chassis 20 are made of the light transmissible resin. For this reason, the front chassis 10 and the rear chassis 20 are provided with the lens protection cover 11, the finder cover 13, the light guide 22 which guides the light from the light emitting diode, the display window 25 of the LCD 69, etc., but the present invention is not restricted to this. The use of a die only for the transparent outer casing makes it possible to form the transparent member, attached to the outer casing, integrally with the outer casing, and reduces the number of parts and assemblers.

As set forth hereinabove, according to the electronic camera of the present invention, the outer casing is made of the light transmissible resin, and there is provided the light shielding means which prevents the unnecessary light from entering the optical system and the photoelectric converter of the electronic camera. This enables the interior of the camera to be seen through with the functions of the electronic camera being maintained, and reduces the stiff image of the electronic camera. Moreover, it is possible to see the workings of movable parts such as the battery, the recording medium and the lens barrel mounted in the camera through the outer casing. It is also possible to form the transparent member, which is provided at the opaque outer casing, integrally with the outer casing, and the number of parts and assemblers can be reduced.

According to the present invention, the backlight of the liquid crystal display illuminates the characters or marks through the outer casing, and it is therefore possible to read the characters or marks for confirming the functions of the operating switch in the dark. Moreover, the fluorescent material is added to the resin of the outer casing, or the fluorescent member is applied or attached to the outer casing and the parts built in the camera, and therefore, the camera can emit light with the electronic flash light, etc. thereof and inform a person as a subject of the position of the camera even in the dark. Furthermore, the outer casing is provided with the slit into which the decoration sheet, the name sheet, the spare recording medium, etc. are inserted, and the sheet material inserted into the slit can be confirmed through the outer casing. The electronic camera can be distinguished from other electronic cameras of the same type.

Moreover, according to the present invention, the part facing to the light emission means provided in the camera is thinner than the other parts of the outer casing. It is therefore possible to secure a sufficient quantity of transmitted light without reducing the strength of the outer casing, and it is also possible to identify the display part from the surface of the outer casing. Furthermore, the transparent outer casing is suitable for providing a plurality of display devices in the camera, and it is possible to display the state of the camera by emission of the light emitting devices.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera, comprising:
   an outer casing made of light transmissible resin;
   an optical system fixed within said outer casing for guiding light therein;
   an electronic imaging device for receiving said guided light;
   a diaphragm mechanism for limiting the quantity of said guiding light that can enter said electronic imaging device; and
   shielding means attached to said outer casing and covering said optical system and said diaphragm mechanism for preventing unnecessary light from outside said outer casing from entering into said optical system and said electronic imaging device.

2. The electronic camera as defined in claim 1, wherein said optical system is a taking lens.

3. The electronic camera as defined in claim 1, further including a liquid crystal display with back light provided in said outer casing, wherein characters or marks are printed on said outer casing in proximity to said liquid crystal display, thereby causing said back light of said liquid crystal display to illuminate said characters or marks.

4. The electronic camera as defined in claim 1, wherein at least one of said outer casing and a plurality of built-in parts in said camera has fluorescent properties.

5. The electronic camera as defined in claim 1, wherein a recording medium mounted in said camera is visible through said outer casing.

6. The electronic camera as defined in claim 1, wherein a part of said outer casing forms part of a battery housing which is visible through said outer casing.

7. The electronic camera as defined in claim 1, further including a slit formed in said outer casing, said slit receiving at least one of a decoration sheet, name sheet and spare recording medium, each of which when inserted into said slit is visible through said outer casing.

8. The electronic camera as defined in claim 1, further including a rib formed integrally with said outer casing.

9. The electronic camera as defined in claim 1, further including a lens barrel attached adjacent to a side of said outer casing.

10. The electronic camera as defined in claim 1, further including:
    a plurality of light emission devices, each visible through said outer casing, said plurality of light emission means emitting a light to display operational data of said electronic camera.

11. An electronic camera, comprising:
    an outer casing made of light transmissible resin;

an electronic imaging device fixed within said outer casing;
an electronic flash device;
a sensor which is a photoelectric converter to control said electronic flash device;
an optical system fixed within said outer casing for guiding light into said sensor; and
shielding means provided on said outer casing for preventing unnecessary light from outside said outer casing from entering into said sensor.

12. The electronic camera as defined in claim 11, wherein said shielding means is at least one of masking coating, light-shielding paper and light-shielding member.

13. The electronic camera as defined in claim 11, further including a liquid crystal display with back light provided in said outer casing, wherein characters or marks are printed on said outer casing in proximity to said liquid crystal display, thereby causing said back light to illuminate said characters or marks.

14. The electronic camera as defined in claim 11, wherein at least one of said outer casing and a plurality of built-in parts in said camera has fluorescent properties.

15. The electronic camera as defined in claim 11, wherein a recording medium mounted in said camera is visible through said outer casing.

16. The electronic camera as defined in claim 11, wherein a part of said outer casing forms part of a battery housing which is visible through said outer casing.

17. The electronic camera as defined in claim 11, further including a slit formed in said outer casing, said slit receiving at least one of a decoration sheet, a name sheet and a spare recording medium, each of which when inserted into said slit is visible through said outer casing.

18. The electronic camera as defined in claim 11, further including a rib formed integrally with said outer casing.

19. The electronic camera as defined in claim 11, further including a lens barrel attached adjacent a side of said outer casing.

20. The electronic camera as defined in claim 11, further including a plurality of light emission devices, each visible through said outer casing, said plurality of light emission means emitting a light to display operational data of said electronic camera.

21. An electronic camera comprising:
an outer casing made of light transmissible resin;
a light emission means;
an optical system fixed within said outer casing for guiding light therein
a photoelectric converter for receiving said guided light; and
light shielding means provided on said outer casing and arranged between said light emission means and said outer casing thereby preventing the incidence of light from said light emission means from entering into said optical system and said photoelectric converter by way of said outer casing.

22. The electronic camera as defined in claim 21, wherein said light emission means is a light emitting display device.

23. The electronic camera as defined in claim 21, wherein said light emission means is an electronic flash device.

24. The electronic camera as defined in claim 23, wherein said optical system is a light guide which guides light to a sensor to control said electronic flash device, and said photoelectric converter is said sensor.

25. The electronic camera as defined in claim 21, wherein said optical system is a lens, and said photoelectric converter is an imaging device.

26. The electronic camera as defined in claim 21, wherein said light shielding means is at least one of masking coating, light shielding paper and a light shielding member.

27. The electronic camera as defined in claim 21, wherein said light shielding means is a diffusive surface formed on said outer casing.

28. The electronic camera as defined in claim 21, wherein a recording medium mounted in said camera is visible through said outer casing.

29. The electronic camera as defined in claim 21, wherein a part of said outer casing forms part of a battery housing the inside of which is visible through said outer casing.

30. The electronic camera as defined in claim 21, further including a plurality of light emission devices, each visible through said outer casing, said plurality of light emission means emitting a light to display operational data of said electronic camera.

31. An electronic camera, comprising:
a front chassis fixedly connected to a rear chassis; and
a plurality of light emitting devices visible through said rear chassis for providing camera data, wherein a portion of said rear chassis facing said plurality of light emitting devices is thinner than other portions of said rear chassis to provide sufficient viewing of said camera data without reducing the strength of said rear chassis.

32. An electronic camera comprising:
an outer casing made of light transmissible resin;
a light emission means fixed within said outer casing for providing camera information, said light emission means visible through said outer casing; and
wherein a part of said outer casing facing said light emission means is thinner than other parts of said outer casing, thereby providing a sufficient quantity of transmitted visible light without reducing strength of said outer casing.

33. An electronic camera, comprising:
an outer casing made of light transmissible resin and including a lens protection cover thereon;
an optical system fixed within said outer casing for guiding light therein;
a photoelectric converter for receiving said guided light; and
shielding means attached to said outer casing and contacting said protection cover for preventing unnecessary light from outside said outer casing from entering into said optical system and said photoelectric converter.

34. An electronic camera, comprising:
a front chassis including a lens protection cover on an outer side thereof;
a rear chassis, said front and rear chassis formed of a light transmissible resin and attached to form an outer casing;
an optical system fixed to said front chassis for guiding light therein;
a photoelectric converter for receiving said guided light; and
a plurality of light-shielding elements attached to said outer casing, including at least a shielded cover fixed to said front chassis and contacting said lens protection cover for preventing unnecessary light from outside said outer casing from entering into said optical system and said photoelectric converter.

35. The electronic camera of claim 34, further including an electronic flash device producing a light flash, wherein said light flash and external ambient light entering through said outer casing is shielded from said optical system and said photoelectric converter.

36. The electronic camera of claim 34, further including a plurality of light emitting devices visible through a rear side of said rear chassis for providing visual camera data.

37. The electronic camera of claim 36, said plurality of light-shielding elements including shielding material interposed between said plurality of light emitting devices and said optical system and photoelectric converter to prevent light incident from said plurality of light emitting devices from entering said optical system and photoelectric converter.

38. The electronic camera of claim 34, wherein said optical system is a taking lens and said photoelectric converter is an imaging device.

39. The electronic camera of claim 34, further including a recording medium mounted in a slit interposed between said front and rear chassis at a side of said outer casing, a portion of said outer casing forming at least part of a battery housing, said recording medium and battery housing visible through said outer casing.

40. The electronic camera of claim 34, said plurality of light-shielding elements including at least one of a masked coating film, a light shielding member and light shielding paper.

41. The electronic camera as defined in claim 32, further including a plurality of light emission devices, each visible through said outer casing, said plurality of light emission means emitting a light to display operational data of said electronic camera.

* * * * *